United States Patent
Berlandier et al.

(10) Patent No.: US 9,460,408 B2
(45) Date of Patent: Oct. 4, 2016

(54) METHOD AND APPARATUS FOR GENERATING TEST SCENARIOS FOR A SET OF BUSINESS RULES

(71) Applicant: International Business Machines Corporation, Armonk, NY (US)

(72) Inventors: Pierre Berlandier, San Diego, CA (US); Zhen Huan Zhou, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 396 days.

(21) Appl. No.: 14/138,870

(22) Filed: Dec. 23, 2013

(65) Prior Publication Data

US 2015/0178625 A1     Jun. 25, 2015

(51) Int. Cl.
*G06Q 10/06* (2012.01)

(52) U.S. Cl.
CPC ........ *G06Q 10/067* (2013.01); *G06Q 10/0637* (2013.01)

(58) Field of Classification Search
None
See application file for complete search history.

(56) References Cited

U.S. PATENT DOCUMENTS

| | | | |
|---|---|---|---|
| 6,338,055 B1 * | 1/2002 | Hagmann | G06F 17/30448 |
| 6,408,291 B1 * | 6/2002 | Skeen | G06F 17/30457 |
| | | | 707/721 |
| 6,931,392 B1 * | 8/2005 | Skeen | G06F 17/3046 |
| 7,680,752 B1 * | 3/2010 | Clune, III | G06Q 10/06 |
| | | | 706/45 |
| 8,239,835 B2 | 8/2012 | Rex et al. | |
| 8,364,469 B2 | 1/2013 | Neale | |
| 2010/0312592 A1 | 12/2010 | Sallakonda et al. | |
| 2013/0085977 A1 * | 4/2013 | Junker | G06N 5/025 |
| | | | 706/47 |
| 2014/0249875 A1 * | 9/2014 | Junker | G06Q 10/06 |
| | | | 705/7.11 |

OTHER PUBLICATIONS

Garofalakis, Minos, et al. "Building decision trees with constraints." Data Mining and Knowledge Discovery 7.2 (2003): 187-214.*
Mittal, Sanjay, and Brian Falkenhainer. "Dynamic constraint satisfaction."Proceedings Eighth National Conference on Artificial Intelligence. 1990.*

* cited by examiner

*Primary Examiner* — Stanley K Hill
*Assistant Examiner* — David H Kim
(74) *Attorney, Agent, or Firm* — Law Office of John Timar (57) ABSTRACT

A method for automatically generating test scenarios for a plurality of business rules created to form a ruleset for a business domain. A plurality of decision variables is extracted from a business object model associated with the business domain using a computer system. The plurality of business rules is parsed using a syntactic parser operating on the computer system to extract at least one condition expression and an assignment action. A collection of mutually exclusive constraint satisfaction problems is built from the decision variables, condition expressions, and assignment actions using a constraint problem generator operating on the computer system. A plurality of test scenarios is generated automatically from each identified constraint satisfaction problem in the collection using a constraint solver engine operating on the computer system.

18 Claims, 7 Drawing Sheets

FIG. 1

|   | A | B | C | D | E | F | G | H | I |
|---|---|---|---|---|---|---|---|---|---|
| 1 |   |   | BORROWER | | | LOAN | | | |
| 2 | SCENARIO NAME | DESCRIPTION | YEARLY INCOME | CREDIT SCORE | NAME | AMOUNT | APPROVED | YEARLY INTEREST RATE | DURATION |
| 3 | SCENARIO 1 | GOOD CREDIT, GET RATE WITH INSURANCE | 75,000 | 600 | JOHN SIMONS | 250,000 | FALSE | 0.0625 | 120 |
| 4 | SCENARIO 2 | GOOD CREDIT, GET HIGHER RATE | 110,000 | 700 | JANE HOWE | 300,000 | FALSE | 0.0575 | 120 |
| 5 | SCENARIO 3 | GOOD CREDIT, GET RATE | 125,000 | 750 | ISABELL MINER | 500,000 | FALSE | 0.0625 | 120 |
| 6 | SCENARIO 4 | GOOD CREDIT, GET LOWER RATE | 100,000 | 800 | FERNANDO RODRIGUEZ | 300,000 | FALSE | 0.075 | 120 |
| 7 | SCENARIO 5 | GOOD CREDIT, LOAN TOO HIGH | 90,000 | 700 | JACLYN POEMS | 500,000 | FALSE | 0.0775 | 120 |
| 8 |   |   |   |   |   |   |   |   |   |

METHOD AND APPARATUS FOR GENERATING TEST SCENARIOS FOR A SET OF BUSINESS RULES

BACKGROUND

Embodiments of the invention generally relate to Business Rules Management Systems (BRMS) and, more particularly, to generating test scenarios for a set of executable business rules.

Business rules are logical "if-then" statements that provide the basis for automating the repeatable decisions that control a business. Policies and practices are expressed as natural language-based rules instead of computer code. Business rules support complex decision-making in various contexts such as business processes, custom web applications, and decision services for service-oriented architecture (SOA). BRMS are software systems that enable business rules to be defined, deployed, monitored, and maintained separately from application code. By externalizing business rules and providing tools to manage them, a business rules management system enables professionals to define and maintain rules, reducing the amount of time needed to update production systems, and increasing the organization's ability to respond to changes in the business environment. BRMS platforms usually provide test harness components allowing the user to define and execute test scenarios against the business rules. One example of a BRMS platform is WebSphere Operational Decision Management (WODM) available from IBM Corporation. Business rules are stored in a central repository that can be accessed across the business enterprise. BRMS allow business experts to define, manage and deploy an enterprise's operational business decisions as services, available for use by any enterprise application or business process. Although the BRMS model accelerates the development lifecycle and allows business users to directly participate in managing automated decisions, it does not dispense with the necessity for thoroughly testing the business rules that comprise the decision when creating or bringing change to a business policy.

While tools to support the capture and execution of test scenarios are usually provided by the BRMS platform, tools for automatically creating (or helping to create) pertinent test scenarios are not available. Test scenario creation is an entirely manual activity and a challenge for business users because of the large number of variables in the business object model and the complex logical relationships between the different business entities.

Business users often expect, but do not get any assistance from the BRMS platform to create the content of function test scenarios. Furthermore, the business users have such a deep knowledge of their functional domain that they have a tendency to overlook test scenarios that may seem functionally unreasonable.

At the same time, from a system integrity point of view, the Information Technology (IT) group needs the assurance that each rule in the decision has been tested before the rule can be safely deployed to the production environment.

BRIEF SUMMARY

In an exemplary embodiment, a method is provided to automatically create pertinent test scenarios for a given set of business rules using constraint programming technology. The disclosed approach ensures proper test coverage for the rules and relieves the business users from the tedium of manually creating test scenarios. A lot of specificity of the method depends on the very specific nature and semantics of business rules execution, which differs from the sequential logic of an imperative program execution.

In one embodiment, a method is provided for automatically creating positive and negative test scenarios for a set of executable business rules. A test scenario is said to be positive for a given business rule if it leads to the firing of this business rule and, conversely, a test scenario is said to be negative for a business rule if its execution will not fire the business rule.

The method uses a constraint solver to represent the conditions and actions of the business rules as constraints between the variables involved in the rule conditions.

For each subset of the rules (also known as "rule tasks") in the tested ruleset, a constrained solution space is created using the rule conditions and variable assignments in the actions of this subset in the form of constraints. If the resulting solution space is not empty, a test scenario can be selected as an element of this constrained solution space.

The business users who formulate the business rules can additionally guide the selection of the most suitable test scenarios by specifying additional constraints on the domain of values of the business variables.

The disclosed method determines a value for the variables when the domain is known. However, if not all the domains are known, the method is still applicable and yields partially defined test scenarios that can then be completed manually by the business users.

In one embodiment, a method is provided to automatically generate test scenarios (comprised of test input values and expected output values) for a set of business rules. Test scenarios are generated that ensure coverage of all business rule combinations in a ruleset. The test scenarios are generated with some guidance provided in the form of additional constraints by the user.

In one embodiment, a method is provided for automatically generating test scenarios for business rules. A syntactic parser is utilized against business rules and the supporting object model to extract variables, condition expressions, and assignment actions. A collection of mutually exclusive constraint satisfaction problems is built between the variables, conditions, and assignment actions. Test scenarios are automatically generated by solving each identified constraint satisfaction problem in the collection.

In one embodiment, a method is provided for automatically generating test scenarios for a plurality of business rules created to form a ruleset for a business domain. A plurality of decision variables is extracted from a business object model associated with the business domain using a computer system. The plurality of business rules is parsed using a syntactic parser operating on the computer system to extract at least one condition expression and an assignment action. A collection of mutually exclusive constraint satisfaction problems is built from the decision variables, condition expressions, and assignment actions using a constraint problem generator operating on the computer system. A plurality of test scenarios is generated automatically from each identified constraint satisfaction problem in the collection using a constraint solver engine operating on the computer system.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

The following description is provided as an enabling teaching of embodiments of the invention including the best, currently known embodiment. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

With a Business Rule Management System (BRMS), developers design business rules independently from the application logic. Business users can manage the business rules. Rulesets are standalone, executable containers corresponding to a decision. Rules are atomic expressions of policies and rules pertaining to a given decision and are organized and stored in a ruleset. Rulesets interact with a calling application by means of input and output parameters. The automation of policies and their application to events can generate decisions.

With a BRMS, business logic can be written in business terms rather than in programming language terms. A business rules developer creates a business object model that describes the data on which a business decision is based. The business object model is assigned a natural language vocabulary. All elements of the business decision are written in terms of this vocabulary. For an application to take advantage of the business decision, the following elements are required: (1) a mapping from the business object model to Java objects or Extensible Markup Language (XML) schemas of the application environment, and (2) a set of input and output parameters describing the data passed to the ruleset and the data expected to be received back in terms of the business object model.

Automated test scenario generation is a feature that is frequently requested by business users as well as business Information Technology (IT) groups. No method currently exists, in the context of BRMS, to perform or assist the user in the creation of test scenarios for a set of business rules.

Although, some test scenario generation systems have used constraint solvers, they require the user to build a separate model of the tested system using constraints.

The disclosed embodiments do not require a separate model and use the business rules directly to derive the constraints. The disclosed embodiments focus on providing test coverage. There is no need to create a new model to generate the test scenarios. The business rules themselves, as defined in the BRMS platform, are the model used to generate the test scenarios. This means that there are no discrepancies in the generated tests due to the impedance of creating an intermediate model. The disclosed method transforms the source business rules into constraints that are then solved to generate test scenarios.

A business decision is implemented as a structured set of such rules (called a ruleset). The role of a business rule engine is to consider the business rules in turn, and when all the conditions of the rule are true for the given input decision variables, the actions of the rule are executed. The decision variables are usually associated with a domain of values which is often enumerated (e.g., the list of U.S. States, the possible type of loans offered by the lender, etc.).

Business rules in a BRMS are logical statements that have the following general form:

If <condition-1> and . . . and <condition-n>

Then <action-1>, . . . , <action-m>

Below are two sample business rules R1 and R2 in the mortgage lending domain:

rule R1:
    If loan-amount/property-value >80% and property-state is in (LA, AK, MO)
    Then set loan-request to "rejected"

rule R2:
    if loan amount/property-value <60%
    then set loan-request to "rejected"

A condition in a business rule is a logical statement which can be evaluated to a Boolean value. It can thus be seen as a constraint that must be verified by the variables involved in the condition. Once such constraint from the above example is loan amount/property-value >80%. Similarly, an assignment action in a business rule can be seen as a constraint that grounds the value.

Briefly, conditions (the "if" part of business rules) established from a BRMS can be used as constraints that are fed to a constraint programming (CP) engine. The solutions to the constraint models created from the business rules are test scenarios that ensure that a subset of the business rules are applied or not applied.

Figure 1:
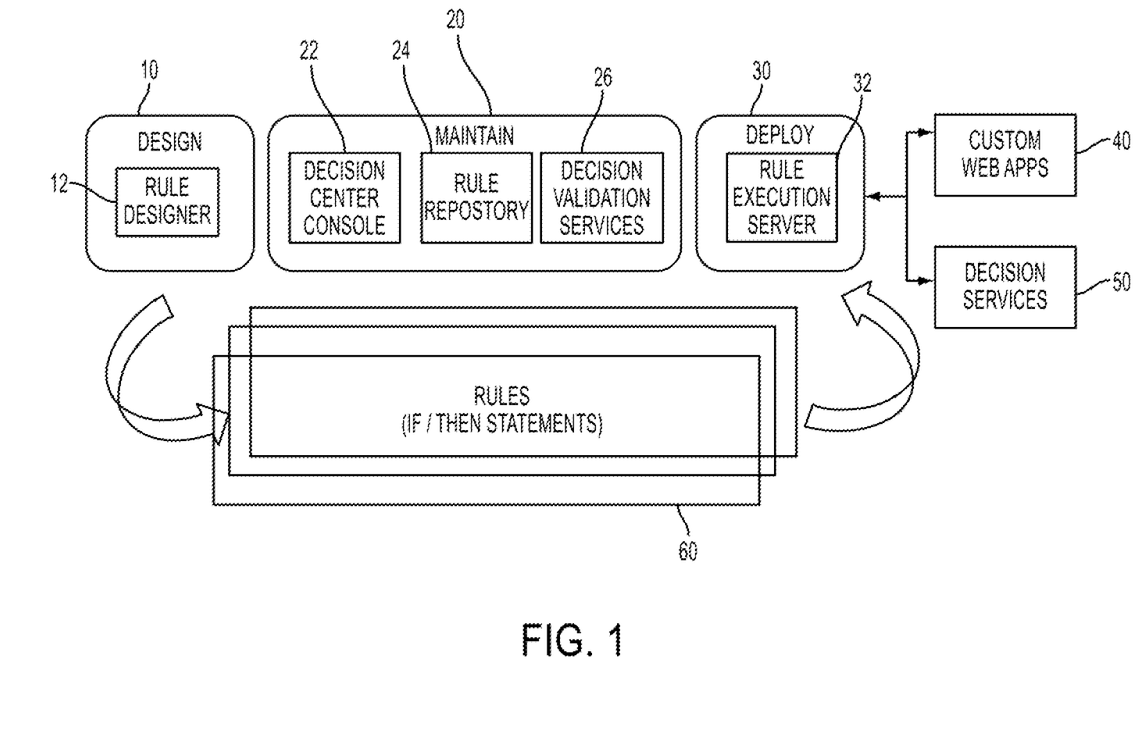
FIG. 1 illustrates a Business Rules Management System (BRMS) platform used in implementation of exemplary embodiments.

FIG. 1 illustrates the principal components of the WebSphere Operational Decision Management (WODM) BRMS platform available from IBM Corporation that can be used in the implementation of the exemplary embodiments. Using this platform, business rules (if/then statements) describe (declarative) and implement (executable) a decision point in a business policy. For example, claim validation for an insurance company system is such a decision point. Mathematical relationships defined among the elements of the system are used to declare a constraint-based model of this system. The constraint programming engine then can be applied to request finding a set of values for the elements of the system that will satisfy all the constraints that have been defined. Additionally, an objective function can be specified to maximize or minimize in order to search for an optimal solution.

The main modules of the WODM BRMS platform shown in FIG. 1 are a design module 10, a maintenance module 20, and a deployment module 30. The design module 10 includes the rule designer tool 12. The rule designer application enables the rule designer to set up a business object model and to start writing rules 60 that are displayed on a graphical user interface display. When deployed, the rules are executed by a rule execution server 32. The maintenance module 20 includes the decision center console 22, the rule repository (rules database) 24, and decision validation services tool 26. The decision center console is a user interface that is intended for business users. The decision validation services tool enables the expression of some test scenarios. However, the user has to define the test scenarios explicitly using the WODM BRMS platform without the benefit of implementation of the disclosed embodiments. The deploy module 30 includes the rule execution server 32 that executes the business rules. After the business rules are tested, the rules engine can be integrated into custom web applications 40 or into decision services 50 for a service-oriented architecture (SOA).

Figure 2:
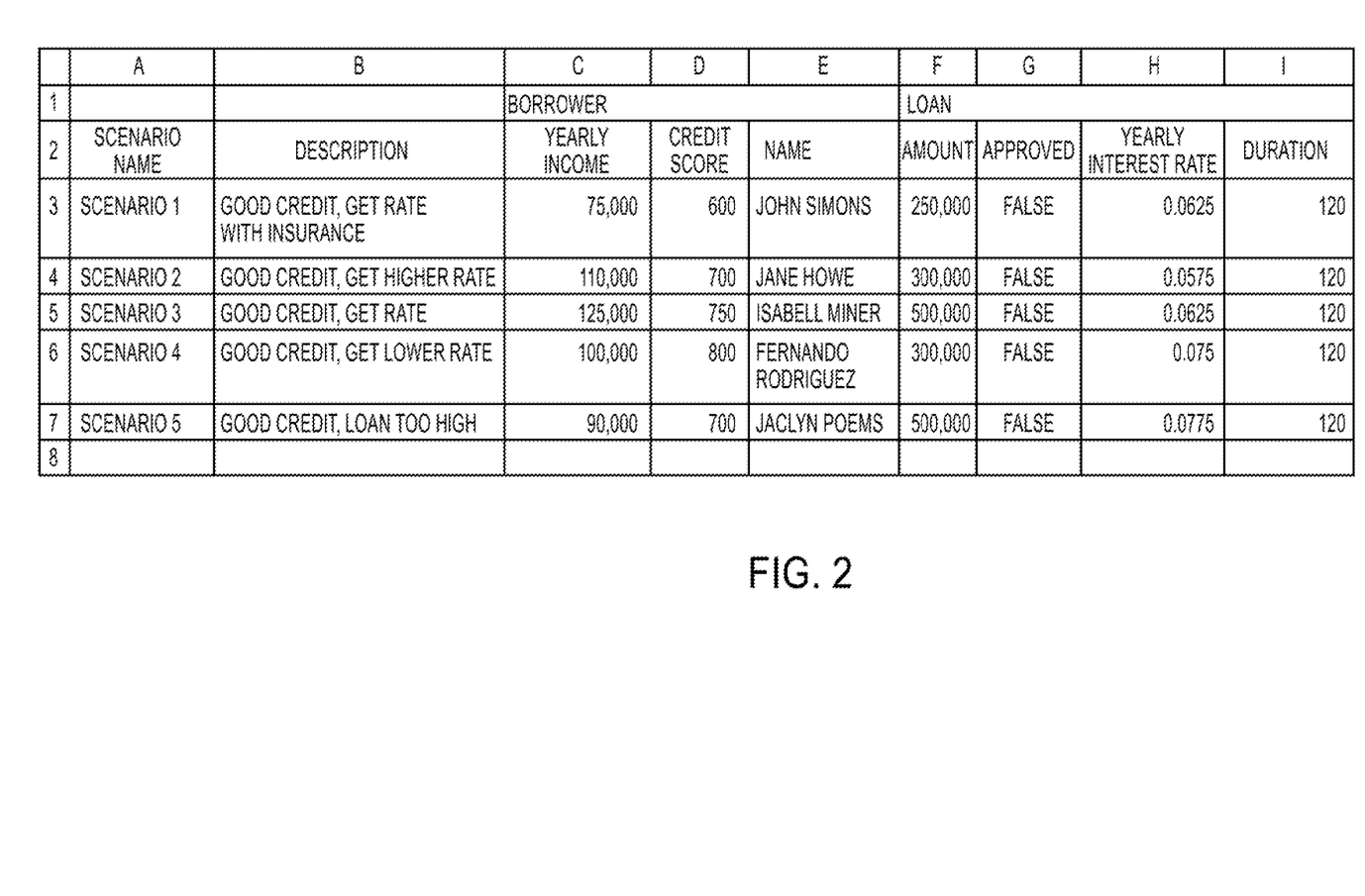
FIG. 2 illustrates a spreadsheet including a plurality of test scenarios created using the BRMS platform of FIG. 1.

FIG. 2 illustrates a spreadsheet including a plurality of test scenarios created using the WODM BRMS platform of FIG. 1. In existing BRMS platforms, test scenarios have to be designed and defined manually. To create a test scenario for the mortgage lending domain, FIG. 2 indicates that, for each scenario, a scenario description, borrower yearly income, borrower credit score, borrower name, loan amount, loan status (approved/disapproved), yearly interest rate, and loan duration have to be defined. This process is a tedious and time-consuming activity and requires manual calculation to obtain the expected values. With a large number of variables and complex logic, it is difficult to design a test suite with good rule coverage. In addition, business users tend to overlook scenarios that seem unreasonable functionally, e.g., having out-of-bounds or contradictory values.

In an exemplary embodiment, when a set of business rules (rule task) is considered for execution, a subset of the rules (the ones for which the conditions are satisfied) will fire and be executed. For example, for a set of rules {R1, R2, R3}, potentially any combinations in this subset could fire, i.e. { }, {R1}, {R2}, {R3}, {R1, R2}, {R1, R3}, {R2, R3}, {R1, R2, R3}. In generating test scenarios, the exemplary method for generating test scenarios explores (through constructing a tree of constraint problems) all the possible subsets (if they are consistent), thus providing complete test scenario coverage for the rule task. The exemplary method also takes into account the assignment actions of the rules, and uses them to reline (i.e., further constrain) the definition of test scenarios.

The constraint satisfaction problems can be solved to create test scenario data. User preferences (soft constraints) can be used to guide the construction of the test scenarios. This allows generating test scenarios that exercise every combination of rules from a set of business rules thereby ensuring the coverage of all the possible execution alternatives. Building test scenarios that have realistic values from a business point of view provide a good base of test scenarios that can then be altered and extended by the business users.

Figure 3A:
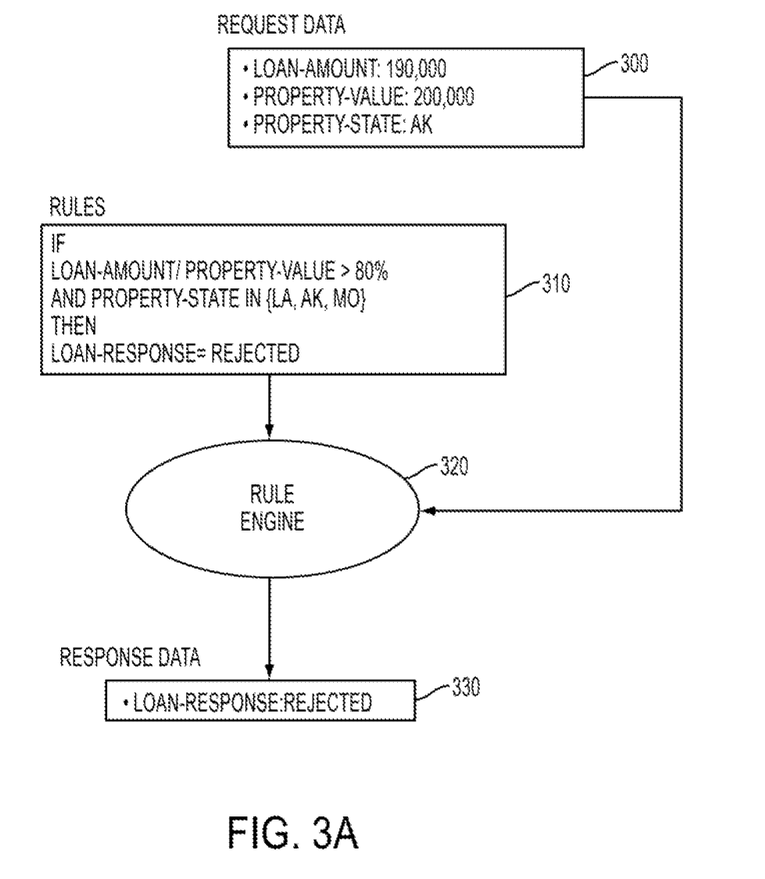
FIG. 3A illustrates exemplary rule execution processing logic in accordance with an exemplary embodiment.
Figure 3B:
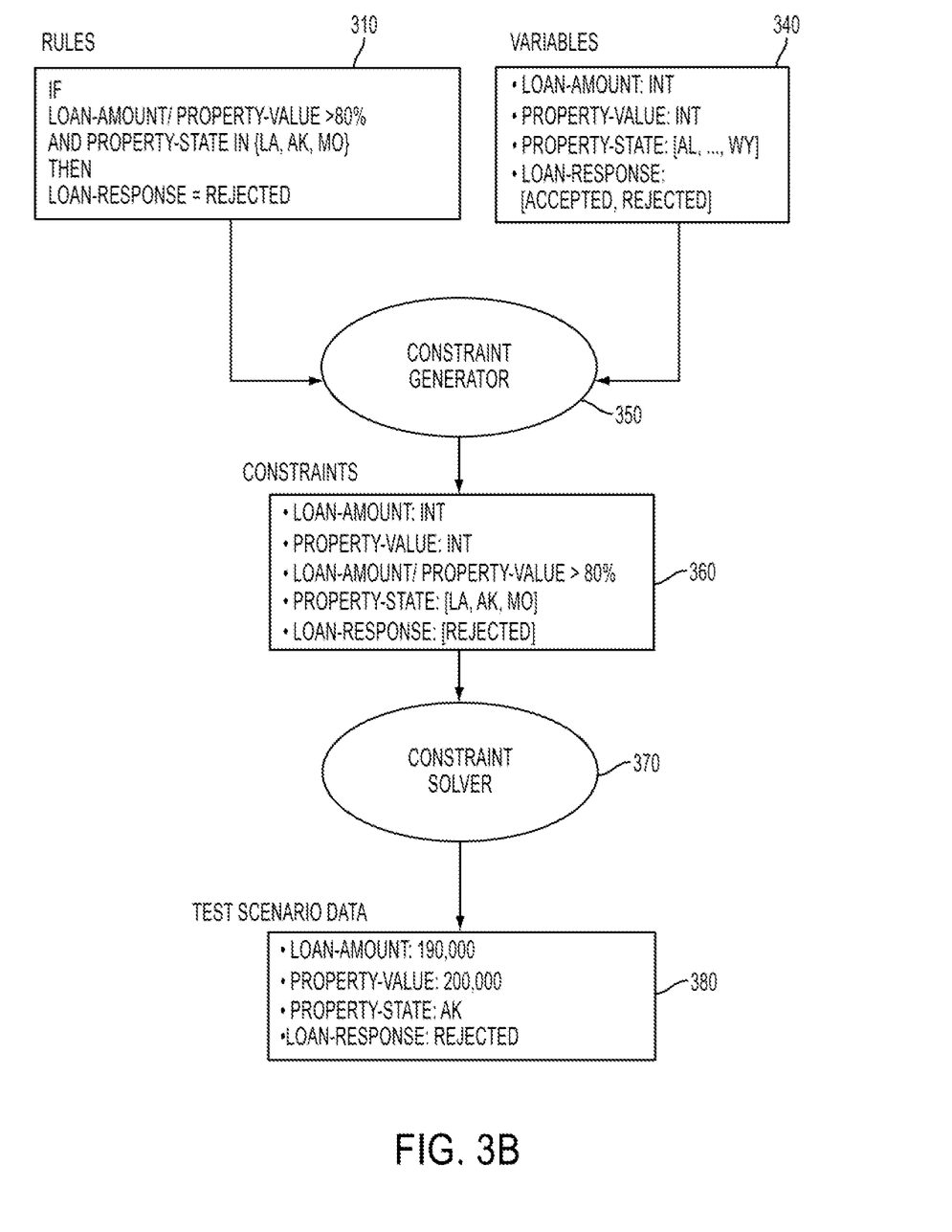
FIG. 3B illustrates exemplary scenario generation processing logic in accordance with an exemplary embodiment.

In one exemplary embodiment, business rule conditions and actions are transformed automatically into a set of constraint satisfaction problems. FIGS. 3A-3B illustrate exemplary rule execution and scenario generation processing logic for a mortgage lending domain, respectively. In FIG. 3A, request data (loan amount, property value, and property state) 300 and business rules 310 are input to a rule engine 320. Executing the business rules in rule engine 320 results in response data 330 (loan rejected).

In FIG. 3B, mortgage lending rules shown in block 310 and decision variables shown in block 340 are input to a constraint generator shown in block 350. The decision variables include loan amount (integer value), property value (integer value), property state (enumeration of states), and loan response (accepted, rejected). The constraint generator 350 yields a set of constraints identified in block 360 including loan amount (integer), property value (integer), loan amount/property value >80%, property state (LA, AK, MO), and loan response (rejected). The constraints are then input to a constraint solver shown in block 370 which results in the automatic generation of test scenario data shown in block 380.

The following components can be used to generate test scenarios for a ruleset in an exemplary embodiment. A syntactic parser can be used on the rules to extract the conditions and assignment actions of the business rules. A variable definition extractor can extract the list of decision variables from the rules Business Object Model (BOM), along with their type and domain. A constraint generator can create the tree of constraint satisfaction problems. A constraint solver can find a solution to a given constraint satisfaction problem. Then, an initial constraint satisfaction problem is initialized with the definition of the input decision variables and their domains. A constraint optimization platform that can be used in exemplary embodiments to implement these software components is the ILOG Optimization Decision Manager Enterprise Developer Edition available from IBM Corporation.

A binary tree of constraint satisfaction problems (CSPs) is generated in accordance with an exemplary embodiment. For each rule in the ruleset, two separate constraint satisfaction problems branches are created using a constraint solving engine.

The first CSP branch ("positive" for a given rule) includes the conditions of the rule as well as the assignment actions in the form of constraints. For example, for a rule of the form "if C1 and C2, then A1," the constraints C1, C2, and A1 would be added to this first constraint satisfaction problem. The second CSP branch ("negative" for a given rule) includes the negation of the conditions of the rule as constraints. For example, using the previous rule, the constraint "not (C1) or not (C2)", which is the logical negation of conditions "C1 and C2" would be added to this second constraint satisfaction problem.

While building these constraint satisfaction problems (CSPs) for each rule of the ruleset in sequence, the method of adding a "positive" and a "negative" version of the rule conditions builds a binary tree of CSPs. The leaves of this binary tree represent CSPs that can then be solved by the constraint engine to find the desired set of pertinent test scenarios.

Figure 4:
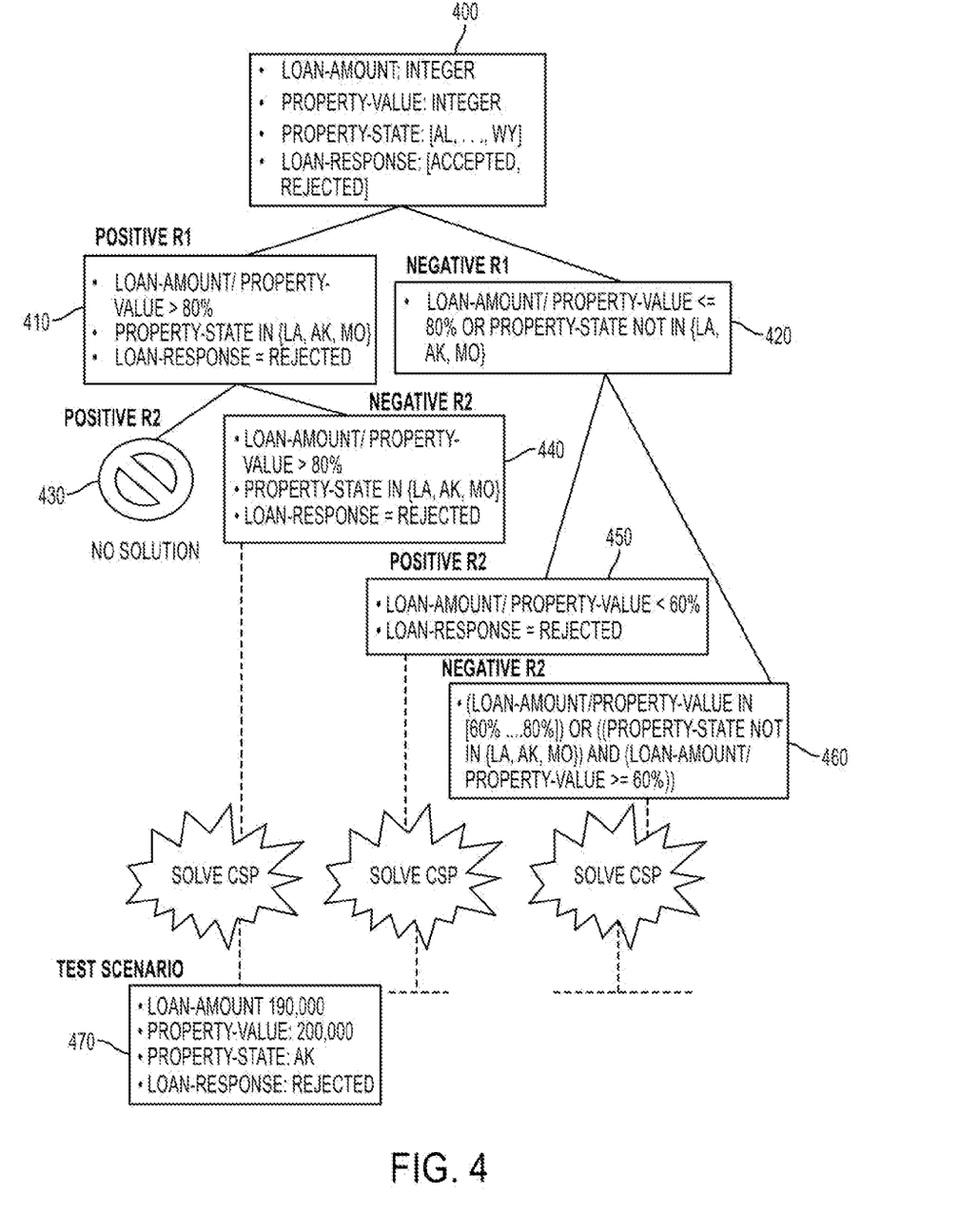
FIG. 4 illustrates a binary tree of constraint satisfaction problems (CSPs) in accordance with an exemplary embodiment.

Considering the exemplary rules R1 and R2 discussed previously, the method would create the binary tree shown in FIG. 4. The decision variable definitions are shown in block 400. The "positive" R1 partial constraint satisfaction problem (CSP) 410 includes the conditions (loan amount/property value >80% and property state in {LA, AL, MO}), and the assignment action (loan request rejected). The "negative" R1 CSP 420 includes the negation of the conditions of the rule as constraints (loan amount/property value <=80% or property state not in {LA, AK, MO}). In turn, the "positive" R1 CSP is enriched with constraints derived from Rule R2, resulting in two children. The first one includes the constraints derived from the conditions and actions of Rule R2, resulting in the "positive" R2 CSP 430 which yields no solution (due to conflicting constraints). The second one includes the constraints derived from the negation of the conditions of Rule R2, resulting in the "negative" R2 CSP 440. The "negative" R1 CSP 420 is enhanced with the "positive" R2 CSP 450 and the "negative" R2 CSP 460. The solution of the constraint satisfaction problem for "positive" R1 and "negative" R2 generates the test scenario shown in block 470. Similarly, the solutions to the constraint satisfaction problems for "negative" R1 and "positive" R2, and "negative" R1 and "negative" R2, also generate test scenarios (not shown in FIG. 4).

Figure 5:
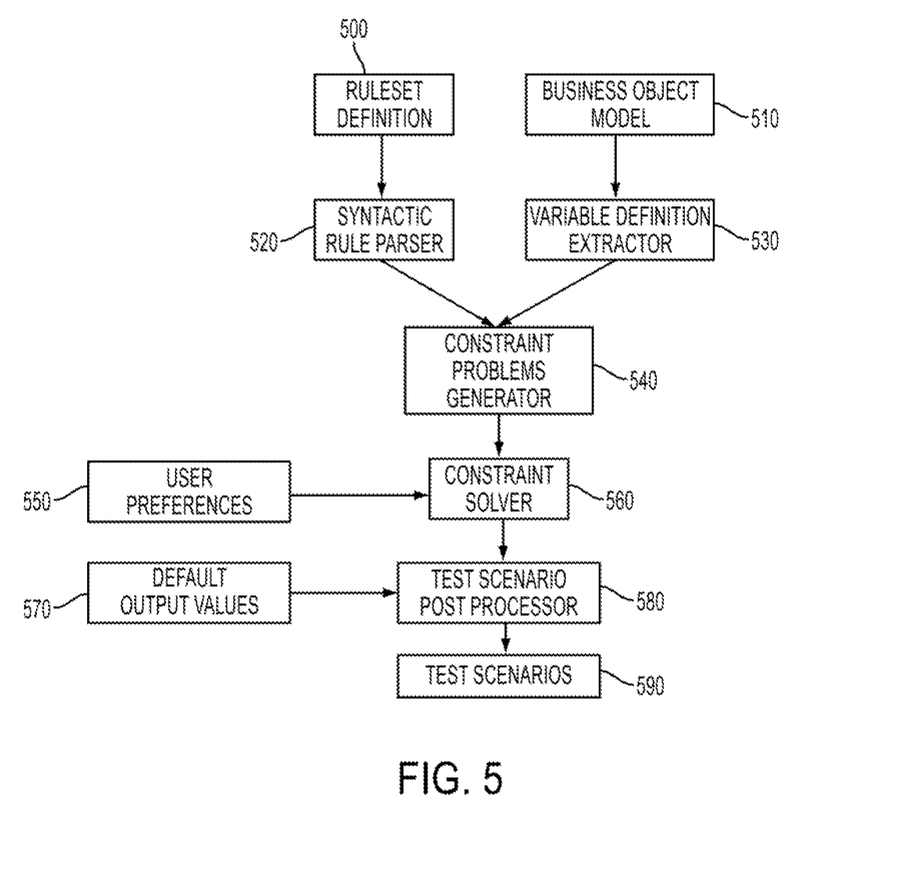
FIG. 5 illustrates the components required for generating test scenarios from business rules in accordance with an exemplary embodiment.

FIG. 5 illustrates the components required for generating test scenarios from business rules in exemplary embodiments. A variable definition extractor as shown in block 530 extracts the definitions of decision variables (type of variables and associated domain) from the business object model of the BRMS platform as shown in block 510. A syntactic parser as shown in block 520 parses the business rules as shown in ruleset definition block 500 to extract the condition expressions and the assignment actions. A constraint problem generator, as shown in block 540, traverses the ruleset and, for each rule, create two CSP branches (one with the rule conditions and rule actions and one with negation of the rule conditions). The constraint solver engine 560 eventually solves the CSPs to extract a test scenario, as shown in block 590. A user preference component 550 allows the user to express preferences on the values selected during the solving of the constraint satisfaction problem. When the values of the expected output decision variables are not defined by the constraint solving process, the implementation can be completed by an additional post-processing component shown in block 580 which assigns default values from block 570 to the output decision variables in generating test scenarios in block 590.

Figure 6:
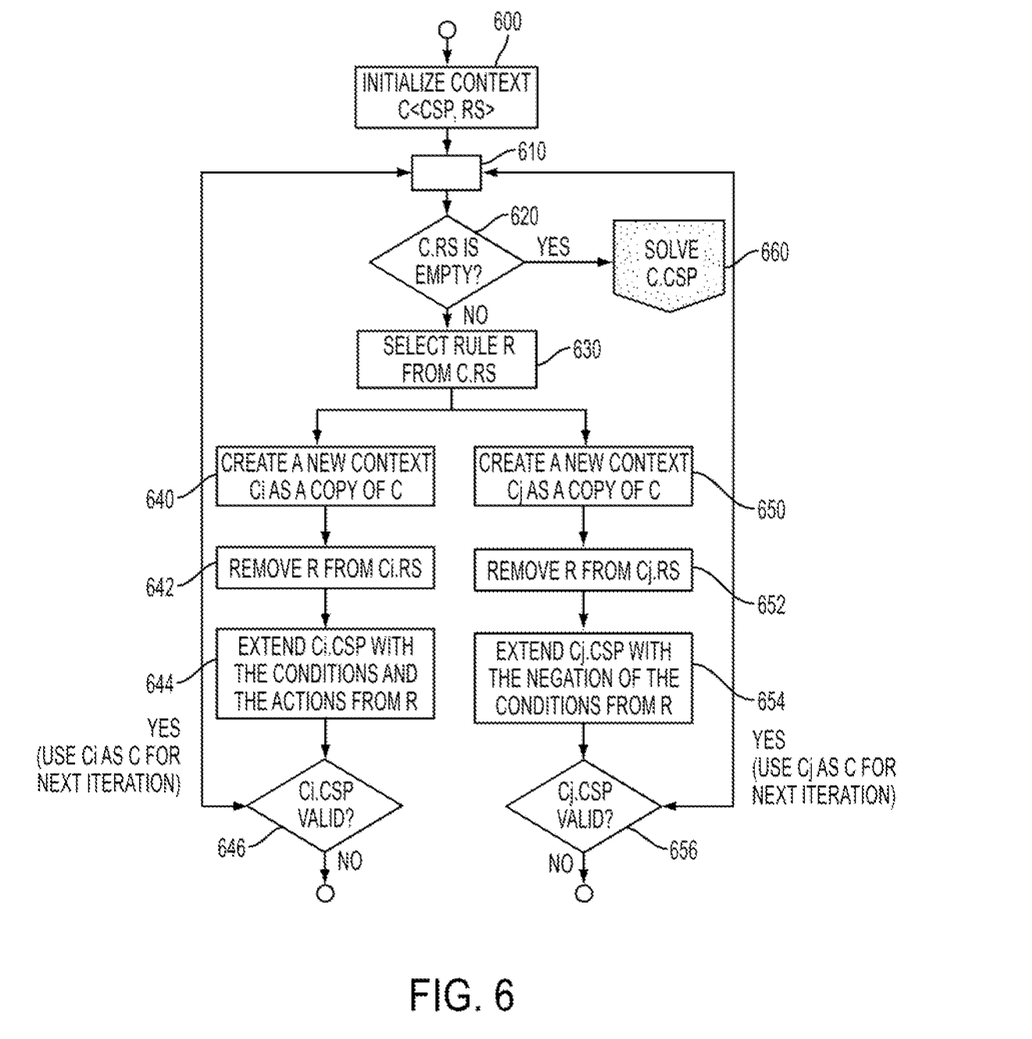
FIG. 6 illustrates processing logic for the constraint problem generator in accordance with an exemplary embodiment.

FIG. 6 illustrates processing logic for the constraint problems generator 540 in accordance with an exemplary embodiment. The context C is a pair <CSP, RS> comprising a constraint satisfaction problem (C.CSP) and a ruleset (C.RS). The goal of the constraint problem generation process is to iterate through all the rules in the ruleset C.RS and to add the constraints (either positive or negative) to the partial constraint satisfaction problem C.CSP. Block 610 represents a loop back point in the processing logic. In decision block 620, a determination is made whether or not the ruleset C.RS is empty. When the ruleset C.RS is empty, then the constraint satisfaction problem is solved as indicated in block 660. If ruleset C.RS is not empty, then two branches are executed: one for the constraints derived from the rule conditions and its actions, starting in block 640, and one for the constraints derived from the negation of the rule conditions, starting in block 650.

In block 640, a new context $C_i$ is created as a copy of context C. Rule R is removed from the ruleset $C_i$.RS as indicated in block 642. The partial constraint satisfaction problem is then extended with the conditions and actions from Rule R, as indicated in block 644. In decision block 646, a determination is made as to whether or not partial constraint satisfaction problem $C_i$.CSP is valid. If the partial constraint satisfaction problem $C_i$.CSP is valid, then processing returns to loop back point 610 to proceed with addition of the next rule in the ruleset, if the ruleset is not empty. If the partial constraint satisfaction problem $C_i$.CSP is not valid, then processing on this branch of the tree ends.

In block 650, a new context $C_j$ is created as a copy of context C. Rule R is removed from the ruleset $C_j$.RS as indicated in block 652. The partial constraint satisfaction problem is then extended with negation of the conditions from Rule R, as indicated in block 654. In decision block 656, a determination is made whether or not the partial constraint satisfaction problem C.CSP is valid. If the partial constraint satisfaction problem C.CSP is valid, then processing returns to loop back point 610 to proceed with the next rule in the ruleset, if the ruleset is not empty. If the partial constraint satisfaction problem $C_j$.CSP is not valid, then processing on this branch of the tree ends.

Continuing with the example of FIG. 4 and applying the processing logic of FIG. 6, the rules in the ruleset of the example are as follows:

rule R1:
   If loan-amount/property-value >80% and property-state is in {LA, AK, MO}
   Then set loan-request to "rejected."
rule R2:
   If loan-amount/property-value <60%
   Then set loan-request to "rejected."

Initial CSP State

In the initial state, only the variable definitions with their associated domains are in the initial constraint satisfaction problem as illustrated in block 400:
1. loan-amount: int
2. property-value: int
3. property-state: [AL, . . . , WY]
4. loan-response: [accepted, rejected]

Adding Rule 1 to Initial CSP

The conditions of Rule 1 (loan-amount/property-value >80% and property-state in {LA, AK, MO}) and the actions of Rule 1 (loan-response=rejected) are added as constraints to the initial CSP as illustrated in block 410. The resulting CSP is:
1. loan-amount: int
2. property-value: int
3. property-state: [AL, . . . , WY]
4. loan-response: [accepted, rejected]
5. loan-amount/property-value >80%
6. property-state in {LA, AK, MO}
7. loan-response=rejected Since constraint 6 (property-state in {LA, AK, MO}) is more restrictive than constraint 3, (property-state: [AL, . . . , WY]), the CSP can be simplified as follows:
1. loan-amount: int
2. property-value: int
3. loan-amount/property-value >80%
4. property-state in {LA, AK, MO}
5. loan-response=rejected Adding Rule 2 to Initial CSP and Rule 1

The conditions of Rule 2 (loan-amount/property-value <60%) and the actions of Rule 2 (loan-response=rejected) are added as constraints to the initial CSP and positive Rule 1. The resulting CSP is:
1. loan-amount: int
2. property-value: int
3. loan-amount/property-value >80%
4. property-state in {LA, AK, MO}
5. loan-response=rejected
6. loan-amount/property-value <60%
7. loan-response=rejected Since constraints 3 and 6 are contradictory, a dead-end has been reached and the scenario generation for this branch ends as indicated in termination symbol 430.

Adding Negation of Rule 2 Conditions to Initial CSP and Rule 1

The negation of the conditions of Rule 2 (loan-amount/property-value <60%) are added as constraints to the initial CSP and positive Rule 1. The resulting CSP is:

1. loan-amount: int
2. property-value: int
3. loan-amount/property-value >80%
4. property-state in {LA, AK, MO}
5. loan-response=rejected
6. loan-amount/property-value >=60%

Since constraint 6 (loan-amount/property-value >=60%) is weaker than constraint 3 (loan-amount/property-value >80%), constraint 6 can be ignored. The CSP can be simplified further as illustrated in block 440:
1. loan-amount: int
2. property-value: int
3. loan-amount/property-value >80%
4. property-state in {LA, AK, MO}
5. loan-response=rejected This CSP can now be solved by the constraint solver as shown in block 470 to obtain a test scenario.

Adding Negation of Rule 1 Conditions to Initial CSP

The negation of the conditions of R1 (loan-amount/property-value >80% and property-state in {LA, AK, MO}) illustrated in block 420 are added as constraints to the initial CSP. The resulting CSP is:
1. loan-amount: int
2. property-value: int
3. property-state: [AL, . . . , WY]
4. loan-response: [accepted, rejected]
5. (loan-amount/property-value <=80%) or (property-state not in {LA, AK, MO})

Adding Rule 2 to Initial CSP and Negation of Rule 1 Conditions

The conditions of Rule 2 (loan-amount/property-value <60%) and the actions of Rule 2 (loan-response=rejected) are added as constraints 6 and 7 to the initial CSP and negative Rule 1. The resulting CSP is:
1. loan-amount: int
2. property-value: int
3. property-state: [AL, . . . , WY]
4. loan-response: [accepted, rejected]
5. (loan-amount/property-value <=80%) or (property-state not in {LA, AK, MO})
6. loan-amount/property-value <60%
7. loan-response=rejected By combining constraint 5 and constraint 6, this CSP can be re-written:
1. loan-amount: int
2. property-value: int
3. property-state: [AL, . . . , WY]
4. ((loan-amount/property-value <=80%) and (loan-amount/property-value <60%)) or ((property-state not in {LA, AK, MO}) and (loan-amount/property-value <60%))
5. loan-response=rejected This CSP can be further rewritten by further simplifying new constraint 4:
1. loan-amount: int
2. property-value: int
3. property-state: [AL, . . . , WY]
4. (loan-amount/property-value <60%) or ((property-state not in {LA, AK, MO}) and (loan-amount/property-value <60%))
5. loan-response=rejected This CSP can now be solved by the constraint solver to obtain a test scenario.

Since loan-amount/property value <60% is more restrictive, this CSP can be further simplified as illustrated in block 450:

1. loan-amount: int
2. property-value: int
3. property-state: [AL, . . . , WY]
4. loan-amount/property-value <60%
5. loan-response=rejected Adding Negation of Rule 2 Conditions to Initial CSP and Negation of Rule 1 Conditions The negation of the conditions of Rule 2 (loan-amount/property-value <60%) is added as a constraint to CSP and negative Rule 1. The resulting CSP is:
1. loan-amount: int
2. property-value: int
3. property-state: [AL, . . . , WY]
4. loan-response: [accepted, rejected]
5. (loan-amount/property-value <=80%) or (property-state not in {LA, AK, MO})
6. loan-amount/property-value >=60%

By combining constraint 5 and constraint 6, this CSP can be re-written:
1. loan-amount: int
2. property-value: int
3. property-state: [AL, . . . , WY]
4. loan-response: [accepted, rejected]
5. ((loan-amount/property-value <=80%) and (loan-amount/property-value >=60%)) or ((property-state not in {LA, AK, MO}) and (loan-amount/property-value >=60%))

By simplifying new constraint 5, this CSP can be re-written further as illustrated in block 460:
1. loan-amount: int
2. property-value: int
3. property-state: [AL, . . . , WY]
4. loan-response: [accepted, rejected]
5. (loan-amount/property-value in [60% . . . 80%]) or ((property-state not in {LA, AK, MO}) and (loan-amount/property-value >=60%))

This CSP can now be solved by the constraint solver to obtain a test scenario.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A method for automatically generating test scenarios for a plurality of business rules created to form a ruleset for a business domain, comprising:

extracting a plurality of decision variables from a business object model associated with the business domain using a computer system;

parsing the plurality of business rules using a syntactic parser operating on the computer system to extract at least one condition expression and an assignment action;

building a collection of mutually exclusive constraint satisfaction problems from the decision variables, condition expressions, and assignment actions using a constraint problem generator operating on the computer system, by generating a binary tree of partial constraint satisfaction problems by traversing the ruleset and, for each rule, creating a first branch with the rule conditions and rule actions and a second branch with negation of the rule conditions; and generating a test scenario automatically from each identified constraint satisfaction problem in the collection using a constraint solver engine operating on the computer system.

2. The method of claim 1 wherein the business rules are defined for a business rules management system (BRMS), the method further comprising identifying addition constraints and refining the domain of the variables via a user interface (UI).

3. The method of claim 1 wherein test scenarios are generated for positive and negative outcomes of condition expressions.

4. The method of claim 3 further comprising generating test scenarios for combinations of outcomes of condition expressions by generating test scenarios for all paths.

5. The method of claim 1 further comprising determining if each of the partial constraint satisfaction problems is valid during the traversal of the ruleset, and solving each identified constraint satisfaction problem when the traversal of the ruleset reaches a corresponding leaf of the binary tree.

6. The method of claim 1 further comprising receiving and applying at least one user value preference for each identified constraint satisfaction problem by the constraint solver engine.

7. The method of claim 1 further comprising assigning at least one default value to an output decision variable if an expected value for the output decision variable is not defined by the constraint solver engine.

8. A computer program product for automatically generating test scenarios for a plurality of business rules created to form a ruleset for a business domain when executed on a computer processor, the computer program product comprising a non-transitory computer readable medium having embedded thereon:
program instructions that cause the processor to extract a plurality of decision variables from a business object model associated with the business domain;
program instructions that cause the processor to parse the plurality of business rules to extract at least one condition expression and an assignment action;
program instructions that cause the processor to build a collection of mutually exclusive constraint satisfaction problems from the decision variables, condition expressions, and assignment actions;
program instructions that cause the processor to generate a binary tree of partial constraint satisfaction problems by traversing the ruleset and, for each rule, creating a first branch with the rule conditions and rule actions and a second branch with negation of the rule conditions; and
program instructions that cause the processor to generate a test scenario automatically from each identified constraint satisfaction problem in the collection.

9. The computer program product for automatically generating test scenarios of claim 8, the computer readable medium further comprising program instructions that cause the processor to define and store business rules for a business rules management system (BRMS), the computer readable medium further comprising program instructions that cause the processor to identify additional constraints and refine the domain of the variables.

10. The computer program product for automatically generating test scenarios of claim 8, the computer readable medium further comprising program instructions that cause the processor to generate test scenarios for positive and negative outcomes of condition expressions.

11. The computer program product for automatically generating test scenarios of claim 8, the computer readable medium further comprising program instructions that cause the processor to generate test scenarios for combinations of outcomes of condition expressions by generating test scenarios for all paths.

12. The computer program product for automatically generating test scenarios of claim 8, the computer readable medium further comprising program instructions that cause the processor to determine if each of the partial constraint satisfaction problems is valid during the traversal of the ruleset, and to solve each identified constraint satisfaction problem when the traversal of the ruleset reaches a corresponding leaf of the binary tree.

13. The computer program product for automatically generating test scenarios of claim 8, the computer readable medium further comprising program instructions that cause the processor to receive and apply at least one user value preference for each identified constrained solution space.

14. A system for automatically generating test scenarios for a plurality of business rules created to form a ruleset for a business domain, comprising:
a memory device for storing a plurality of software modules;
a processor for executing the plurality of modules, including:
a module for extracting a plurality of decision variables from a business object model associated with the business domain;
a module for parsing the plurality of business rules to extract at least one condition expression and an assignment action;
a module for building a collection of mutually exclusive constraint satisfaction problems from the decision variables, condition expressions, and assignment actions;
a module for generating a binary tree of partial constraint satisfaction problems by traversing the ruleset and, for each rule, creating a first branch with the rule conditions and rule actions and a second branch with negation of the rule conditions; and
a module for generating a test scenario automatically from each identified constraint satisfaction problems in the collection.

15. The system for automatically generating test scenarios of claim 14 further comprising a module for identifying additional constraints and refining the domain of the variables.

16. The system for automatically generating test scenarios of claim 14 further comprising a module for generating test scenarios for positive and negative outcomes of condition expressions.

17. The system for automatically generating test scenarios of claim 16 further comprising a module for generating test scenarios for all paths.

18. The system for automatically generating test scenarios of claim 14 further comprising a module for determining if each of the partial constraint satisfaction problems is valid during the traversal of the ruleset, and solving each identified constraint satisfaction problem when the traversal of the ruleset reaches a corresponding leaf of the binary tree.

* * * * *